No. 755,953. PATENTED MAR. 29, 1904.
W. H. SMITH.
FRICTION COUPLING.
APPLICATION FILED JUNE 6, 1903.
NO MODEL.
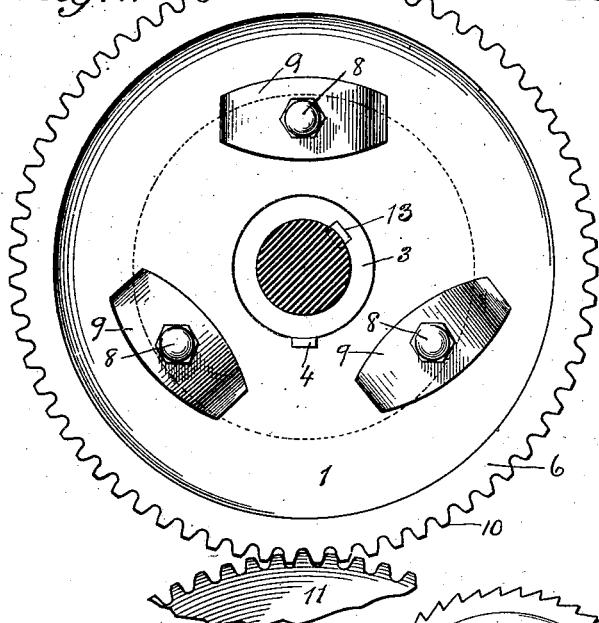
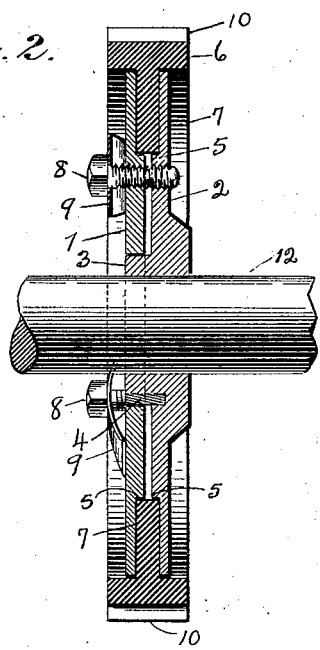
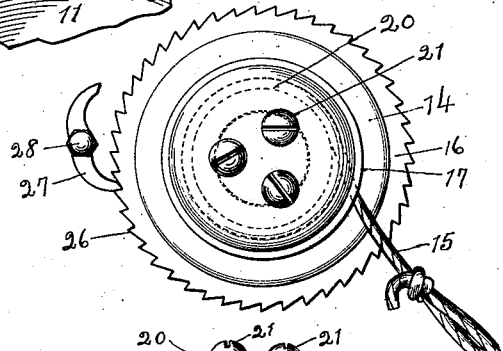
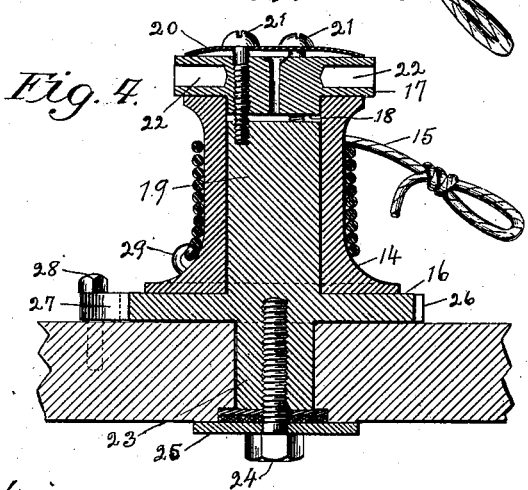
Witnesses
Edward G. Rowland
Anna R. McCole
Inventor
William H. Smith
By his Attorney
Edward P. Thompson No. 755,953. Patented March 29, 1904.

UNITED STATES PATENT OFFICE.

WILLIAM HENRY SMITH, OF PAWTUCKET, RHODE ISLAND.

FRICTION-COUPLING.

SPECIFICATION forming part of Letters Patent No. 755,953, dated March 29, 1904.

Application filed June 6, 1903. Serial No. 160,352. (No model.)

*To all whom it may concern:*

Be it known that I, WILLIAM HENRY SMITH, a subject of the King of Great Britain, and a resident of Pawtucket, in the county of Providence and State of Rhode Island, have invented certain new and useful Improvements in Friction-Couplings, of which the following is a specification.

The object of my invention is to secure simple and effective means for preventing the breaking of machinery when subjected to excessive strains. For this purpose I provide a friction-coupling of simple construction which under ordinary working conditions remains rigid, but which under a dangerous excess of load will slip. It will also be useful where a given pressure is desired. The coupling is made adjustable as to its frictional resistance, so that the excess of strain under which it will yield may be predetermined.

The invention can be applied to many kinds of machines which are subject to sudden and great increase in the load and would prevent stripping of gears and other breakdowns.
For instance, if an automobile with this improvement were started or stopped too suddenly the coupling would slip a little. Also in rolling machinery this device would be of service, as it is very common on getting some abnormal substance between the rollers to smash the gears to pieces. On cranes and hoists if the load being lifted come in contact with an obstacle instead of breaking that obstacle or the cable slipping would result. This would also apply to mine-elevators. It is apparent that the invention may be applied with similar advantages to belt-driven machinery. Another application is to capstans to prevent breaking of the cables by a sudden jerk or other too great strain.

My device consists, essentially, of a rotary power-transmitting member composed of two parts, each of which has a friction-face parallel to and opposite to that of the other, a second power-transmitting member rotatably mounted on the first-named member between its friction-faces, the second member having friction-faces engaging with those on the first, springs pressing the two parts of the first-named member toward each other and clamping the second member therebetween, driving means connected to one of the members, and a driven device connected to the other of the members.

The device supplies an easy and effective means to prevent breaks or jerks between all driving and driven machinery.

For further description reference will now be had to the accompanying drawings.

Figure 1 is a side elevation of a gear-wheel embodying my invention. Fig. 2 is a section in a vertical plane through the center of Fig. 1. Fig. 3 is a top plan view of a modified form of my invention applied to a capstan. Fig. 4 is a vertical section through the center of the capstan represented in Fig. 3.

My invention as embodied in the gear-wheel has two friction-disks 1 and 2 facing each other, the disk 1 being mounted on a central circular boss 3, integral with the disk 2. A pin 4 is firmly seated in the disk 2 and projecting alongside and flush therewith forms a lug on the periphery of the boss 3, the said lug fitting into a corresponding notch in the disk 1. Thus the two disks 1 and 2 are so interlocked that they must revolve together; but they have a free sliding movement to and from each other. Each of the disks 1 2 has a circular shoulder 5. Mounted on the peripheries of the disks 1 2 is a gear-ring 6, and extending inwardly from the said gear-ring and integral therewith is a friction-flange 7, which is received between the portions of the disks 1 2 from the shoulders 5 outward.

The combined depth of the shoulders 5 is less than the thickness of the flange 7, so that the disks 1 and 2 come in contact with the flange 7, while a space yet remains between the more central portions of the disks themselves. Screw-bolts 8 pass through the centers of flat bow-shaped springs 9 and also loosely through the disk 1 and have a threaded engagement with the disk 2, passing therethrough, the springs 9 pressing the disk 1 toward the disk 2, and thus clamping the friction-flange 7 of the gear-ring 6 between the friction-disks 1 2. The gear-ring 6 has on its periphery teeth 10, which have engagement with a driven gear, a fragment of which is shown at 11, and the disk 2 is firmly secured to a rotating driving-shaft 12, as by a key 13, or the shaft 12 may equally as well be considered as driven and the gear 11 as driving. The tension of the springs 9 may be increased or diminished by turning the bolts 8 in or out, thus augmenting or lessening the clamping pressure of the disks 1 2 on the flange 7 and accordingly raising or lowering the slipping-point of the coupling.

My invention could similarly be applied to a belt-pulley, the only difference in construction being that the gear-teeth 10 would be replaced by a band-face and the gear 11 by a belt or spur-wheel and chain.

In applying my invention to the capstan the same principles are made use of and also virtually the same parts, there merely being changes in shape of the parts to adapt them to use in a capstan instead of a gear-wheel, but no change in the function performed by the several parts so far as the invention itself is concerned. In the capstan shown the winding-cylinder 14 corresponds to the gear-ring 6 and the cable 15 to the driven gear 11. The base friction-disk 16 corresponds to the disk 2 and the cap friction-disk 17 to the disk 1, while the shoulder 18 and the upstanding stud 19, integral with the disk 16, takes the place of the shoulders 5. Counterparts for the boss 3 and lug 4 are omitted; also, the friction-cylinder 14 does not extend over the peripheries of the disks 16 and 17, as does the gear-ring 6 with the disks 1 and 2. The spring 20 and the screws 21 are counterparts of the springs 9 and bolts 8. Driving power is applied to the capstan by inserting a bar into one of the holes 22, which winding-bar would thus be a counterpart of the driving-shaft 12. All corresponding parts in the capstan perform like functions to the counterparts found in the gear-wheel. The spring 20 is of an inverted-saucer shape, and the screws 21 pass loosely through the disk 17 and have threaded engagement in the stud 19. When the screws 21 are turned, the tension of the spring 20 is varied and the friction-disks 16 17 caused to clamp between them with more or less force the friction-cylinder 14, the shoulder 18 and stud 19 not coming together. The capstan is supported to freely revolve in any usual way. It is shown in the drawings as supported by a lower stud 23, integral with the disk 16, and held in place by a bolt 24 and washers 25. The disk 16 has the ratchet-teeth 26, engaged by the pawl 27, secured by the bolt 28, all as usually found in capstans, and the cylinder 14 has an ordinary cable-eye 29. The disks 16 and 17 are held to rotate together by the screws 21, and the cylinder 14 is capable of rotary movement on the stud 19 and shoulder 18.

In the operation of my device the bolts 8 are adjusted sufficiently tight that the coupling will operate rigidly the same as if the disks 1 and 2 and the gear-ring 6 were all in one piece, forming an ordinary gear for all ordinary working strains, but at the same time not so tight but that the gear-ring 6 will slip on the disks 1 2 when the amount of power transmitted through the coupling reaches a dangerous excess. The degree of strain under which it is desired that the coupling shall yield is predetermined by experiment or otherwise and adjustment of the springs 9 made accordingly. This adjustment, of course, may be anything from nothing up to the capacity of the device, but is intended to be such as to allow only a safe margin of security against breakage. In case of sudden starting or stopping or of some obstruction falling into the machinery then my coupling device would yield and avoid a breakdown, the friction-disks 1 and 2 slipping on the friction-flange 7. As soon as the excess of strain ceases or is removed then my coupling continues to transmit power as before the same as if nothing had happened. The lug 4 of the disk 2 interlocking with the disk 1 causes the disks 1 and 2 to revolve together without any shearing strain being put upon the bolts 8. In the case of the capstan the screws 21 are adjusted down till the spring 20 draws the friction-disks 16 and 17 against the winding-cylinder 14 with the proper degree of force that when the cable 15 is subjected to a pull approaching its breaking strain then the cylinder 14 will slip between the friction-disks 16 and 17. Any slipping that may thus take place is immediately recovered in the continued process of winding.

The gear-wheel and capstan shown are simply examples of the application of my invention broadly considered, it being evident that there are yet other uses to which it may be applied.

I claim as my invention—

1. A friction-coupling consisting of a rotary power-transmitting member composed of two sections having opposite friction-faces and also having concentric circular projections extending toward but not meeting each other, a second power-transmitting member supported by said sections and rotatably mounted on said projections between said friction-faces, and devices pressing the two said sections toward each other and clamping the said second member between the said friction-faces, the said second member having friction-faces engaging those on the said sections.

2. A friction-coupling consisting of a rotary power-transmitting member composed of two sections having opposite friction-faces and also having concentric circular projections extending toward but not meeting each other, a second power-transmitting member supported by said sections and rotatably mounted on said projections between said friction-faces, and springs pressing the two said sections toward each other and clamping the said second member between the said friction-faces, the said second member having friction-faces engaging those on the said sections.

3. A friction-coupling consisting of a rotary power-transmitting member composed of two sections having opposite friction-faces and also having concentric circular projections extending toward but not meeting each other, a second power-transmitting member supported by said sections and rotatably mounted on said projections between said friction-faces, springs pressing the two said sections toward each other and clamping the said second member between the said friction-faces, the said second member having friction-faces engaging those on the said sections, and devices for varying the tension of said springs.

4. A friction-coupling consisting of the combination of two disks having opposite friction-faces contiguous to their peripheries, a gear-ring rotatably mounted on the peripheries of said disks, said gear-ring having an integral flange extending inwardly between said disks, said flange having friction-faces engaging with those on said disks, said gear-ring also having gear-teeth on its periphery, springs pressing the two said disks toward each other and clamping the said flange therebetween, devices for varying the tension of said springs, and mechanism independent of said devices for causing said disks to interlock with each other.

5. A friction-coupling consisting of the combination of a rotary shaft, a friction-disk mounted on and keyed to said shaft, said disk having a central circular boss integral therewith, a second friction-disk mounted to slide longitudinally on said boss, a lug projecting radially from said boss and seating in a notch in the said second disk, a gear-ring rotatably mounted on the peripheries of the said disks, said gear-ring having teeth on its periphery, and said gear-ring also having a friction-flange integral therewith and extending inwardly therefrom and received between said disks, and springs pressing the said second disk toward the first-named disk and clamping the said flange between the two said disks.

6. A friction-coupling consisting of the combination of a rotary shaft, a friction-disk mounted on and keyed to said shaft, said disk having a central circular boss integral therewith, a second friction-disk mounted to slide longitudinally on said boss, a lug projecting radially from said boss and seating in a notch in the said second disk, a gear-ring rotatably mounted on the peripheries of the said disks, said gear-ring having teeth on its periphery, and said gear-ring also having a friction-flange integral therewith and extending inwardly therefrom and received between said disks, springs pressing the said second disk toward the first-named disk and clamping the said flange between the two said disks, and means for varying the tension of said springs.

7. In a friction-coupling, the combination of a friction-disk having a circular boss concentric and integral therewith, a second friction-disk mounted to slide longitudinally on said boss, a lug projecting radially from said boss and seating in a notch in said second disk, a gear-ring rotatably mounted on the peripheries of the said disks, said gear-ring having teeth on its periphery and said gear-ring also having a friction-flange integral therewith and extending inwardly therefrom and received between said disks, and springs pressing the said second disk toward the first-named disk and clamping the said flange between the two said disks.

8. In a friction-coupling, the combination of a friction-disk having a circular boss concentric and integral therewith, a second friction-disk mounted to slide longitudinally on said boss, a lug projecting radially from said boss and seating in a notch in said second disk, a gear-ring rotatably mounted on the peripheries of the said disks, said gear-ring having teeth on its periphery and said gear-ring also having a friction-flange integral therewith and extending inwardly therefrom and received between said disks, springs pressing the said second disk toward the first-named disk and clamping the said flange between the two said disks, and means for varying the tension of said springs.

9. A friction-coupling consisting of the combination of a rotary shaft, a friction-disk mounted on and keyed to said shaft, said disk having a circular boss concentric and integral therewith, a second friction-disk mounted to slide longitudinally on said boss, a pin inserted in the first-named disk and projecting flush with said boss alongside thereof, said pin seating in a notch in the said second disk, a gear-ring rotatably mounted on the peripheries of the said disks, said gear-ring having teeth on its periphery, and said gear-ring also having a friction-flange integral therewith and extending inwardly therefrom, said flange being received between the outer portions of said disks, said disks having circular shoulders fitting partly over the edge of said flange, flat bowed springs having their ends resting on the exposed side of said second disk, and screw-bolts passing through the centers of said springs and loosely through said second disk and having threaded engagement with said first-named disk.

10. A friction-coupling consisting of a rotary power-transmitting member composed of two sections having opposite friction-faces and also having concentric circular projections extending toward but not meeting each other, a second power-transmitting member supported by said sections and rotatably mounted on said projections between said friction-faces, springs pressing the two said sections toward each other and clamping the said second member between the said friction-faces, the said second member having friction-faces engaging those on the said sections, and devices for varying the tension of said springs, the tension of said springs always being such that the said coupling is rigid under ordinary load but that the said engaging friction-faces will slip on each other under a predetermined excess of load.

11. A friction-coupling consisting of the combination of two disks having opposite friction-faces contiguous to their peripheries, a gear-ring rotatably mounted on the peripheries of said disks, said gear-ring having an integral flange extending inwardly between said disks, said flange having friction-faces engaging with those on said disks, said gear-ring also having gear-teeth on its periphery, springs pressing the two said disks toward each other and clamping the said flange therebetween, devices for varying the tension of said springs, and mechanism independent of said devices for causing said disks to interlock with each other, the tension of said springs always being such that the said coupling is rigid under ordinary load but that the said engaging friction-faces will slip on each other under a predetermined excess of load.

12. A friction-coupling consisting of the combination of two disks having opposite friction-faces, a power-transmitting ring rotatably mounted between said disks and having friction-faces engaging with those on said disks, springs pressing the two said disks toward each other and clamping the said ring therebetween, devices for varying the tension of said springs, mechanism independent of said devices for causing said disks to interlock with each other so as to rotate together, the tension of said springs always being such that the said coupling is rigid under ordinary load but that the said engaging friction-faces will slip on each other under a predetermined excess of load.

13. A friction-coupling consisting of the combination of a rotary shaft, a friction-disk mounted on and keyed to said shaft, said disk having a central circular boss integral therewith, a second friction-disk mounted to slide longitudinally on said boss, a lug projecting radially from said boss and seating in a notch in the said second disk, a gear-ring rotatably mounted on the peripheries of the said disks, said gear-ring having teeth on its periphery, and said gear-ring also having a friction-flange integral therewith and projecting inwardly therefrom and received between said disks, springs pressing the said second disk toward the first-named disk and clamping the said flange between the two said disks, and means for varying the tension of said springs, the tension of said springs always being such that the said coupling is rigid under ordinary load but that the said disks and the said gear-ring will slip relatively to each other under a predetermined excess of load.

14. In a friction-coupling, the combination of a friction-disk having a circular boss concentric and integral therewith, a second friction-disk mounted to slide longitudinally on said boss, a lug projecting radially from said boss and seating on a notch in said second disk, a gear-ring rotatably mounted on the peripheries of the said disks, said gear-ring having teeth on its periphery, and said gear-ring also having a friction-flange integral therewith and extending inwardly therefrom and received between said disks, springs pressing the said second disk toward the first-named disk and clamping the said flange between the two said disks, and means for varying the tension of said springs, the tension of said springs always being such that the said coupling is rigid under ordinary load but that the said disks and the said gear-ring will slip relatively to each other under a predetermined excess of load.

15. A friction-coupling consisting of the combination of a rotary shaft, a friction-disk mounted on and keyed to said shaft, said disk having a circular boss concentric and integral therewith, a second friction-disk mounted to slide longitudinally on said boss, a pin inserted in the first-named disk and projecting flush with said boss alongside thereof, said pin seating in a notch in the said second disk, a gear-ring rotatably mounted on the peripheries of the said disks, said gear-ring having teeth on its periphery, and said gear-ring also having a friction-flange integral therewith and extending inwardly therefrom, said flange being received between the outer portions of said disks, said disks having circular shoulders fitting partly over the edge of said flange, flat bowed springs having their ends resting on the exposed side of said second disk, and screw-bolts passing through the centers of said springs and loosely through said second disk and having threaded engagement with said first-named disk, the tension of said springs always being such that the said coupling is rigid under ordinary load but that the said disks and the said gear-ring will slip relatively to each other under a predetermined excess of load.

16. In a friction-coupling, the combination of a friction-disk having a circular boss concentric and integral therewith, a second friction-disk mounted to slide longitudinally on said boss, a gear-ring rotatably mounted on the peripheries of the said disks, said gear-ring having teeth on its periphery, and said gear-ring also having a friction-flange integral therewith and extending inwardly therefrom, said flange being received between the outer portions of said disks, said disks having circular shoulders fitting partly over the edge of said flange, flat bowed springs having their ends resting on the exposed side of said second disk, screw-bolts passing through the centers of said springs and loosely through said second disk and having threaded engagement with said first-named disk, and means in addition to said bolts for causing said disks to interlock with each other so as to rotate together, whereby said bolts are relieved of all shearing strain.

17. In a friction-coupling, the combination of two disks having opposite friction-faces, a power-transmitting ring rotatably mounted between said disks and having friction-faces engaging with those on said disks, springs pressing the two said disks toward each other and clamping the said ring therebetween, devices for varying the tension of said springs, and mechanism independent of said devices for causing said disks to interlock with each other so as to rotate together.

18. A friction-coupling consisting of the combination of a rotary shaft, a friction-disk mounted on and keyed to said shaft, said disk having a circular boss concentric and integral therewith, a second friction-disk mounted on and to slide longitudinally on said boss, a gear-ring rotatably mounted on the peripheries of said disks, said gear-ring having teeth on its periphery, and said gear-ring also having a friction-flange integral therewith and extending inwardly therefrom, said flange being received between the outer portions of said disks, said disks having circular shoulders fitting partly over the edge of said flange, said gear-ring being supported by said disks, flat bowed springs having their ends resting on the exposed side of said second disk, and screw-bolts passing through the centers of said springs and loosely through said second disk and having threaded engagement with said first-named disk.

19. A friction-coupling consisting of the combination of a rotary shaft, a friction-disk mounted on and keyed to said shaft, said disk having a circular boss concentric and integral therewith, a second friction-disk mounted on and to slide longitudinally on said boss, a power-transmitting ring rotatably mounted on the peripheries of said disks, said ring having a friction-flange integral therewith and extending inwardly therefrom, said flange being received between the outer portions of said disks, said ring being supported by said disks, springs pressing the two said disks toward each other and clamping the said flange therebetween, and devices for varying the tension of said springs.

20. A friction-coupling consisting of the combination of two disks having opposite friction-faces contiguous to their peripheries, a power-transmitting ring rotatably mounted on the peripheries of said disks, said ring having an integral flange extending inwardly between said disks, said flange having friction-faces engaging with those on said disks, said disks having circular shoulders fitting partly over the edge of said flange, said ring being supported by said disks, springs pressing the two said disks toward each other and clamping the said flange therebetween, and devices for varying the tension of said springs.

21. A friction-coupling consisting of the combination of a rotary shaft, a friction-disk mounted on and keyed to said shaft, said disk having a circular boss concentric and integral therewith, a second friction-disk mounted on and to slide longitudinally on said boss, a power-transmitting ring rotatably mounted on the peripheries of said disks, said ring having a friction-flange integral therewith and extending inwardly therefrom, said flange being received between the outer portions of said disks, said ring being supported by said disks, springs pressing the two said disks toward each other and clamping the said flange therebetween, devices for varying the tension of said springs, and mechanism independent of said devices for causing said disks to interlock with each other, the tension of said springs always being such that the said coupling is rigid under ordinary load but that the said disks and the said ring will slip relatively to each other under a predetermined excess of load.

22. A friction-coupling consisting of the combination of two disks having opposite friction-faces contiguous to their peripheries, a power-transmitting ring rotatably mounted on the peripheries of said disks, said ring having an integral flange extending inwardly between said disks, said flange having friction-faces engaging with those on said disks, said disks having circular shoulders fitting partly over the edge of said flange, said ring being supported by said disks, springs pressing the two said disks toward each other and clamping the said flange therebetween, devices for varying the tension of said springs, and mechanism independent of said devices for causing said disks to interlock with each other, the tension of said springs always being such that the said coupling is rigid under ordinary load but that the said engaging friction-faces will slip on each other under a predetermined excess of load.

In testimony whereof I hereunto sign my name and affix my seal this 29th day of May 1903.

WILLIAM HENRY SMITH. [L. S.]

Witnesses:
ALF. J. SAYWELL,
ROY W. COLE.